Nov. 23, 1937  J. EGGERT ET AL  2,100,134
APPARATUS FOR PROJECTING LENTICULAR FILM
Filed Nov. 24, 1934
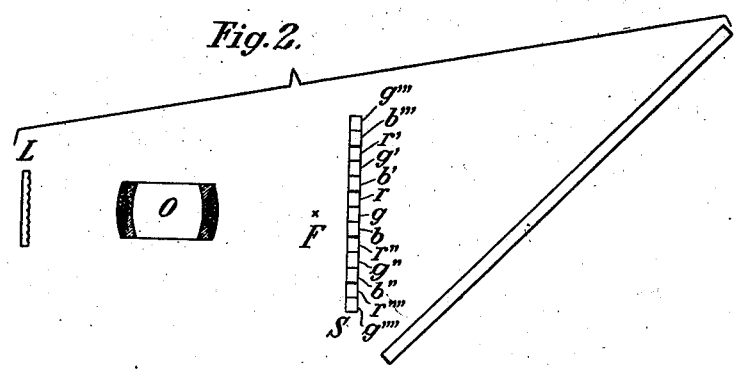
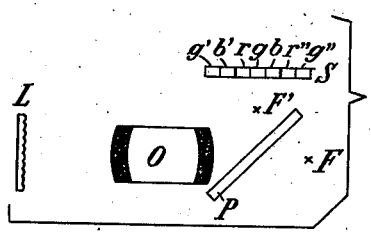
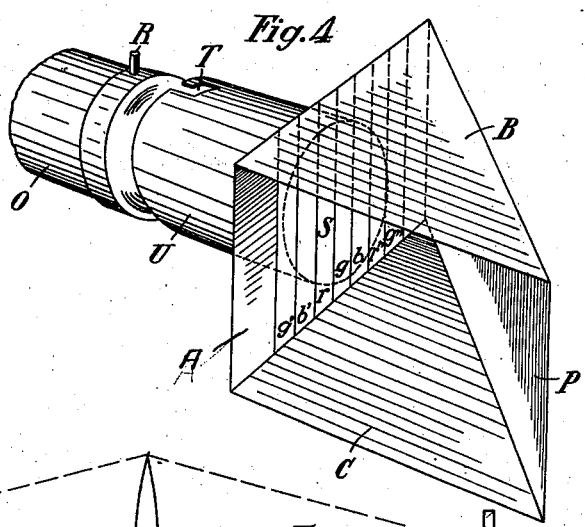
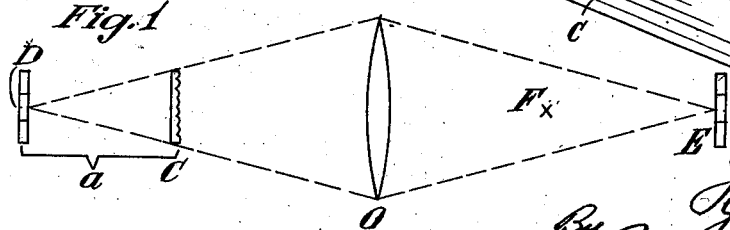

Patented Nov. 23, 1937

2,100,134

UNITED STATES PATENT OFFICE 2,100,134

APPARATUS FOR PROJECTING LENTICULAR FILM

John Eggert, Leipzig-Gohlis, and Gerd Heymer, Wolfen Kreis Bitterfeld, Germany, assignors to I. G. Farbenindustrie Aktiengesellschaft, Frankfort-on-the-Main, Germany Application November 24, 1934, Serial No. 754,656 In Germany November 25, 1933

2 Claims. (Cl. 88—16.4)

Our present invention relates to projection of lenticular film.

One of its objects is an apparatus for projecting lenticular film. Further objects will be seen from the detailed specification following hereafter. Reference is made to the accompanying drawing in which Fig. 1 shows an arrangement for projecting according to this invention, Fig. 2 shows an arrangement for obtaining a uniform illumination of the picture field, Fig. 3 shows an arrangement for projecting a laterally inverted print according to this invention and Fig. 4 shows an arrangement for raising and lowering the picture during projection.

It has been proposed to print on another lenticular film a lenticular film which has been exposed behind a three-color filter, the embossed surfaces of the films being in contact with each other during the printing. This had led to the observation that the filter middle lines, that is to say the lines connecting the middle of the filter image behind each lenticular element with the middle of the coordinate lenticular element with the images of this middle behind the lenticular embossing of the film, no longer intersect on the embossed side but on the emulsion side of the film, so that the point of intersection is at the same distance behind the film as it was during the original exposure. As to the extension of the filter middle lines beyond the film it must be borne in mind that the extensions are somewhat deflected in view of the differing indices of refraction of the film material and air. It has been proposed that in the projection of such lenticular copies there should be arranged between the film and the projection objective an additional lens by which the path of the rays is changed in such a manner that also in the projection of the copy the filter middle lines intersect on the embossed side of the film. Operation with such compensation lenses is, however, inconvenient. Moreover, these lenses have the drawback that they distort the path of the rays, and therefore give rise to a considerable number of faulty pictures, because these lenses generally have a very short focal length and therefore must be very thick in order to fulfill their purpose. This is particularly the case in operation with sub-standard films. In this case a filter-distance of about 40 mm. was always used. Now if a copy is to be made from such a film and if it is desired that the filter shall remain in the same position as it had during the original exposure, the compensation lens must have a focal length of 20 mm. which is impracticable.

By the present invention while avoiding the disadvantages described and without additional optical devices in the path of the rays, a correctly colored projection of a lenticular copy is obtained in which the filter middle lines intersect on the emulsion side of the film. For this purpose the path of the rays is compensated by the objective itself, the projection filter being placed so far in front of the objective that the latter projects a real image of the filter on the emulsion side of the film at a distance from the film corresponding with the distance of the original exposure filter or its virtual image.

In Fig. 1 C is the copy made from a lenticular original film taken in the usual manner with the lenticulated side facing the multi-color filter by printing this film with its lenticulated side in contact with the lenticulated side of the film C, the filter middle lines thereof intersecting at D, at a distance $a$ from the emulsion side of the film C. The projection filter is placed at E at such a distance in front of the projection objective O that the objective produces at D a real image of the projection filter on the emulsion side of the film. F is the focus of the projection objective. The distance of the projection filter from the objective is greater than the focal length of the latter.

In order to obtain a sufficiently uniform illumination of the picture field when the projection filter has the position required by this invention, it is preferable to use a projection filter whose simple sequence of color strips is repeated completely or incompletely one or more times. This is shown in Fig. 2. Referring to this figure, L is the lenticular film, O is the projection objective whose front focal point lies at F. Beyond this point F there is arranged the filter S whose simple sequence of color strips is repeated. Adjacent the middle group $r$, $g$, $b$ there is the group $r'$, $g'$, $b'$ on one side and on the other side the group $r''$, $g''$, $b''$. Adjacent to these groups, there are the groups $b'''$, $g'''$ following $r'$ and on the other side $r''''$, $g''''$ as in incomplete repetition of the middle groups. The distance of the filter corresponds with that of the filter E in Fig. 1.

As the copy, as compared with the original, is laterally inverted, for correct projection a mirror or a reversal prism must be arranged in the path of the rays. It is preferable to use superficially silvered mirrors because the ordinary mirrors which are silvered on the reverse side give double contours. The mirror or the reversal prism can be fitted either between the filter and the objective or between the filter and the screen; in the first case the color strip sequence of the filter must be reversed. The mirror is advantageously united with the projection filter to form one structural unit.

Fig. 3 shows an arrangement wherein the picture is projected so that a correct reproduction of the sides of the picture is obtained. By inserting the mirror P having its reflecting surface on the side which faces the objective the real focal point F is virtually displaced at F'. The filter S having a middle group of strips r, g and b and lateral groups of strips must have the reversed succession of the color strips as shown in Fig. 2 because this succession is reversed by the mirror P. The reversion of the color strips is not necessary if the mirror P is arranged as indicated in Fig. 2.

The filter and the mirror can be fixed either on the housing of the projector or on the objective carrier. Finally, the filter may be arranged adjustably in a frame placed at right angles to the direction of the lenticular embossings, in order that the color of the picture may easily be altered.

In Fig. 4 there is shown, for example, such an arrangement O is the objective. On the bordering edge of the front side of the objective there is mounted a pin R. Over this pin there may be fitted a sleeve U with the aid of a bayonet-catch. On the sleeve U there are mounted by means of the member A the pieces of sheet metal B and C which carry the mirror P arranged at an angle of 45° to the optical axis in front of the multi-color filter S arranged on the piece of sheet metal A. The multi-color filter can be moved in direction perpendicularly to the optical axis as is indicated in Fig. 4 of the drawing. The mirror P projects the picture produced by the objective O on the projection screen.

What we claim is:

1. In an apparatus for projecting lenticular film in combination, a lenticular film in a plane position, a projection objective in front of the lenticulated side of said lenticular film, a multi-color filter arranged in front and beyond the focus of said objective with its color strips parallel to the lenticular elements, said objective and said multi-color filter being arranged at distances from said lenticular film so as to project in co-operation a real image of said multi-color filter opposite the emulsion side of said lenticular film with the images projected by the single lenticular elements in register with the like parts of the color filter record of the lenticular film, and simultaneously to project said film.

2. In an apparatus for projecting lenticular film in combination a positive lenticular film in a plane position having a record of a multi-color filter, a projection objective in front of the lenticulated side of said lenticular film, a multi-color filter having adjacent to the central sequence of color strips lateral color strips following each other in the succession of the central color strips, said multi-color filter being arranged in front and beyond the focus of said objective with its color strips parallel to the lenticular elements of said film, said objective and said multi-color filter being arranged at distances from said lenticular film so as to project in co-operation a real image of said multi-color filter on the emulsion side of said lenticular film and with the images projected by the single lenticular elements in register with the like parts of the color filter record of the lenticular film, and simultaneously to project said film, and means beyond the objective for inverting the picture projected by said objective.

JOHN EGGERT.
GERD HEYMER.